3,174,842
HERBICIDAL METHOD
Stanley R. McLane, Prospectville, John Russell Bishop, Hatfield, and Harvey P. Raman, Philadelphia, Pa., assignors to Amchem Products, Inc., Ambler, Pa., a corporation of Delaware
No Drawing. Original application Oct. 15, 1958, Ser. No. 767,292, now Patent No. 3,014,063, dated Dec. 19, 1961. Divided and this application Sept. 6, 1961, Ser. No. 136,203
7 Claims. (Cl. 71—2.6)

This invention relates to new compositions of matter, and it more particularly relates to new compounds having herbicidal properties.

The present invention is exemplified by 3-amino-2,5-dichlorobenzoic acid and its functional derivatives having the general formula:

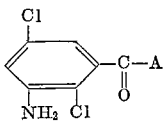

wherein A may be Cl, OH, OH.M, $NH_2$ or OX; M being either an amine selected from the group consisting of mono-, di- and tri-straight or branched chain alkyl amines of from 1 to 12 carbon atoms or an alkanol amine such as mono-, di- or tri-alkanol amine having from 2 to 9 total carbon atoms; and X being either an ammonium radical or an alkali metal ion such as sodium or potassium.

The aforementioned acid as well as the aforementioned functional derivatives thereof, such as the alkali metal and ammonium salts and the amines and amides, have a highly desirable selective herbicidal activity.

Preparations of the 3-amino-2,5-dichlorobenzoic acid as well as some of the functional derivatives thereof are indicated by way of example in a non-limitative manner as follows:

EXAMPLE I 23.6 grams (0.1 mole) of pure 3-nitro-2,5-dichlorobenzoic acid (M.P. 220–221° C.) and 20 grams (0.169 mole) of granular tin are admixed in a flask to which is then added 100 milliliters of water and 100 milliliters of concentrated hydrochloric acid. The flask is then heated to 90°–100° C., this temperature being thereafter maintained until complete solution takes place (usually about 6 hours).

After complete solution has occurred, the entire solution is poured into a mixture of 1000 mls. of water and ice, whereby a crude precipitate is formed. This precipitate is collected and reslurried in 1000 mls. of water to remove any inorganic salt contaminants. The crude precipitate is then recrystallized from boiling water (solubility 6 grams/100 mls.) and dried in an oven at 100° C. A white crystalline product is recovered in about an 80% yield based upon the 3-nitro-2,5-dichlorobenzoic acid; this product being 3-amino-2,5-dichlorobenzoic acid.

The white crystalline product is analyzed as follows:

Melting point: 200–201° C.
Chlorine: Calculated, percent—34.4; found—34.4.
Nitrogen: Calculated, percent—6.8; found—6.73.
Solubility (gm./100 gm. @ 25° C.): Water—0.0007; ethyl alcohol—17.28; i-propyl alcohol—12.69.

EXAMPLE II 20.6 grams (0.1 mole) 3-amino-2,5-dichlorobenzoic acid are dissolved in 100 mls. of methyl alcohol. This mixture is added to a solution containing 5.7 grams (0.1 mole) of 95% sodium methylate dissolved in 100 mls. of methanol. The mixture is then evaporated to 25 mls. on a steam bath. The resulting concentrate is cooled and the precipitated crude sodium salt is recovered by filtration. The crude salt is then purified by recrystallization from methyl alcohol and is then filtered and dried.

Solubility determinations on the sodium salt (based on gm./100 gm. @ 25° C.) were: Water—15.75; ethyl alcohol—8.97; i-propyl alcohol—1.70.

EXAMPLE III

Amine salts of 3-amino-2,5-dichlorobenzoic acid may be prepared by simple admixture of the desired amine with the acid according to the following procedure:

10 grams of 3-amino-2,5-dichlorobenzoic acid is mixed with 10 mls. of water. 5.5 grams of 40% dimethylamine solution is added to this mixture with an accompanying slightly exothermic reaction. Complete solubility results within a few minutes. The mixture is then cooled in an ice bath and a white crystalline precipitate is recovered by filtration.

The amine salt of 3-amino-2,5-dichlorobenzoic acid prepared in the above manner has the following properties:

Melting point: 194–197° C. (decomposed).
Solubility (gm./100 gm. @ 25° C.): Water—29.60; ethyl alcohol—6.90; i-propyl alcohol—1.655.

EXAMPLE IV 20.6 grams (0.1 mole) of pure 3-amino-2,5-dichlorobenzoic acid (M.P. 200–201° C.) are placed in a 125 ml. flask with a condenser. 37 grams (0.3 mole) of thionyl chloride are added and the mixture is refluxed on a steam bath for 6 hours. Excess thionyl chloride is removed by atmospheric distillation over a steam bath and complete removal is accomplished under reduced or subatmospheric pressure. The residue is crude 3-amino-2,5-dichlorobenzoyl chloride.

The preparation is illustrated by the following reaction:

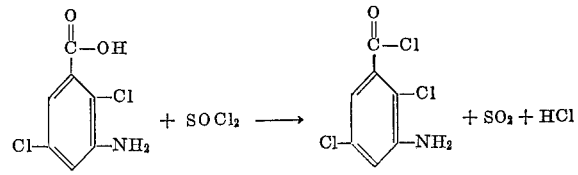

EXAMPLE V 200 mls. of toluene are added to the crude 3-amino-2,5-dichlorobenzoyl chloride obtained in the manner of Example IV. Anhydrous ammonia gas is sparged or sprayed for 30 minutes through the mixture at a temperature of 20–30° C. Thereafter, the reaction product is filtered to recover the precipitated crude product. The crude product is then washed with toluene and dried in an oven. It is then crystallized from boiling water.

The white crystalline product, 3-amino-2,5-dichlorobenzamide, which results from this process is analyzed as follows:

Melting point: 162–163° C.
Chlorine: Calculated, percent—34.0; found, percent (Parr bomb)—34.0.
Solubility (gm./100 gm. @ 26° C.): Water—0.32; ethyl alcohol—11.06; i-propyl alcohol—7.62.

The preparation of this 3-amino-2,5-dichlorobenzamide is a two-stage synthesis whereby the first stage comprises the reaction illustrated in Example IV and the second stage is as follows:

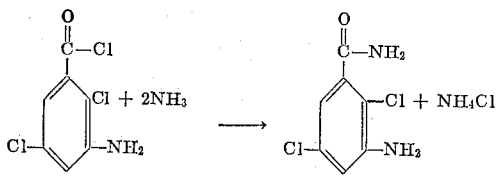

The following table illustrates the high degree of selective herbicidal activity of a 3-amino-2,5-dichlorobenzoic compound. This compound was applied in pre-emergence tests at the rate of 8 lbs./acre of acid equivalent. Visual observations were recorded 17 days after application:

Table

| Test Plant | Visual Observations Using 3-Amino-2,5-Dichlorobenzoic Acid |
|---|---|
| Wheat | No observable injury. |
| Corn | Do. |
| Onion Sets | Do. |
| Snapbeans | No injury to very slight injury. |
| Soybeans | Do. |
| Wild Oats | Moderate injury. |
| Foxtail | Total kill. |
| Ryegrass | Severe injury. |
| Crabgrass | Total kill. |
| Johnson Grass | Severe injury. |
| Dock | Do. |
| Mustard | Total kill. |
| Pigweed | Do. |
| Lamb's-Quarters | Do. |
| Chickweed | Do. |

The compounds of this invention may be applied as both pre- and post-emergence herbicides according to well established practices in the art wherein herbicidally effective amounts of the herbicides are admixed with a herbicidally inert carrier.

This application is a divisional of application Serial No. 767,292, filed October 15, 1958, now United States Patent No. 3,014,063.

What is claimed as the invention is:

1. A method of herbicidally controlling vegetation which comprises applying to the vegetation a herbicidally effective amount of a compound of the formula:

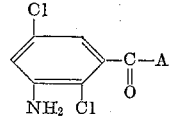

wherein A is a member of the group consisting of OH, OH.M, $NH_2$ and OX; M being an amine selected from the group consisting of straight and branched chain alkyl amines having from 1 to 12 carbon atoms; and X being selected from the group consisting of ammoium ion, sodium ion and potassium ion.

2. The method of claim 1 wherein said compound is sodium salt of 3-amino-2,5-dichlorobenzoic acid.

3. The method of claim 1 wherein said compound is potassium salt of 3-amino-2,5-dichlorobenzoic acid.

4. The method of claim 1 wherein said compound is ammonium salt of 3-amino-2,5-dichlorobenzoic acid.

5. The method of claim 1 wherein said compound is 3-amino-2,5-dichlorobenzoic acid.

6. The method of claim 1 wherein said compound is applied as a pre-emergent herbicide.

7. The method of claim 1 wherein said compound is applied as a post-emergent herbicide.

References Cited in the file of this patent
UNITED STATES PATENTS

| 2,394,916 | Jones | Feb. 12, 1946 |
| 3,013,873 | Hart et al. | Dec. 19, 1961 |

OTHER REFERENCES

Zimmerman et al.: Contributions From Boyce Thompson Institute, vol. 16, pages 419–427.

Thompson et al.: "Botanical Gazette," vol. 107, 1946, pages 475 to 507.

Jones et al.: "Biochemical Journal," vol. 48, pages 422–425, 1951.